United States Patent [19]

Nation

[11] Patent Number: 5,788,317
[45] Date of Patent: Aug. 4, 1998

[54] DUAL PANELED GOLF CART ENCLOSURES

[75] Inventor: Roger Nation, Riverview, Fla.

[73] Assignee: Anwill, Inc., Tampa, Fla.

[21] Appl. No.: 656,768

[22] Filed: Jun. 3, 1996

[51] Int. Cl.$^6$ .................................................. B60J 9/00
[52] U.S. Cl. .......................... 296/141; 160/123; 150/166; 280/DIG. 5
[58] Field of Search .................. 296/141, 136, 296/79, 102; 160/89, 123; 150/166; 280/DIG. 5; 135/88.01, 88.04, 88.05, 88.09, 97, 115, 117, 903; 52/63, 83

[56] References Cited

U.S. PATENT DOCUMENTS

| | | |
|---|---|---|
| 707,347 | 8/1902 | Nelson . |
| 2,546,843 | 3/1951 | Zigterman ................................ 5/364 |
| 3,057,401 | 10/1962 | Gomery et al. ........................ 160/328 |
| 3,682,225 | 8/1972 | Redden ................................... 160/98 |
| 3,698,409 | 10/1972 | Koontz et al. ............................ 135/6 |
| 3,709,553 | 1/1973 | Churchill et al. .................... 296/28 C |
| 4,013,315 | 3/1977 | West ....................................... 296/83 |
| 4,098,536 | 7/1978 | Mills ................................... 296/78 R |
| 4,495,736 | 1/1985 | Lamontagne ............................. 52/63 |
| 4,773,694 | 9/1988 | Gerber .................................. 296/77.1 |
| 4,862,906 | 9/1989 | Jordon .................................... 135/95 |
| 5,211,214 | 5/1993 | Shaw .................................... 160/369 |
| 5,217,275 | 6/1993 | Ridge .................................. 296/77.1 |
| 5,259,656 | 11/1993 | Carroll ................................. 296/77.1 |
| 5,310,235 | 5/1994 | Seymour et al. ..................... 296/77.1 |
| 5,385,380 | 1/1995 | Heavner .............................. 296/84.1 |
| 5,429,404 | 7/1995 | King, Sr. ................................ 296/79 |
| 5,588,690 | 12/1996 | Showalter ............................ 296/77.1 |

*Primary Examiner*—Gary C. Hoge
*Attorney, Agent, or Firm*—Edward M. Livingston, Esq.

[57] ABSTRACT

A golf cart enclosure (2) for all weather and use conditions having a plurality of pairs of inner panels (34) and outer panels (33), which may be a combination of either mesh and plastic vinyl or plastic vinyl and plastic vinyl panels, some of the plastic panels being transparent. The panels are attached to and suspended from an enclosure top panel (3) over a roof (32) of a golf cart (1). The pairs of panels may cover both sides of the golf cart as well as the front and back of the golf cart as desired and necessary. Depending on weather and use conditions, either or both pairs of panels may be secured in a rolled-up position around a perimeter of the golf cart roof by means of panel-holding straps (35, 37 and 40) wrapped around the rolled-up panels and attached to the panel-holding straps between each pair of panels using snaps or other fasteners. A roll cover (9) to protect the rolled-up panels from sun and other elements may be provided by an extension of the top panel or a separate valance. A plurality of combinations of hook straps and/or buckles secure the enclosure and panels to the golf cart. Using a pair of inside screened or mesh panels inside outer plastic panels allows the plastic panels to be rolled-up while the meshed panels are in a down suspended position so that the occupants are protected from insects, but remain cooler than in standard golf cart enclosures with only plastic panels. Alternatively, the outer panel may be used as a storage cover for the golf cart when the cart is stored during the off-season.

26 Claims, 2 Drawing Sheets

DUAL PANELED GOLF CART ENCLOSURES

BACKGROUND OF THE INVENTION

This invention relates to an enclosure for a golf cart or other vehicle during use or storage and, more particularly, to one which combines dual vinyl plastic and/or mesh panels for use in any use and weather condition.

People who use golf carts, such as golfers, and even more particularly, retirees who use golf carts for local transportation in and near their communities, desire to have enclosures, generally made of vinyl, on the golf cart to protect them from adverse weather, such as cold, wind and rain, or from insects. Unfortunately, the materials normally used to make golf cart enclosures, a plastic vinyl, does not allow air to flow through it and thus, makes the occupants of a golf cart feel as though they are in a sauna, especially in hot and muggy weather, when panels of the enclosure are in a down suspended position. In such latter conditions, the occupants either endure the heat or must remove and fold up the vinyl enclosure panels, which then exposes them to insects, such as mosquitos and gnats, or errantly hit golf balls. In other words, with conventional golf cart enclosures its "an-all-or-none" proposition, that is, the panels of the enclosure are either down where they offer protection, or up where they offer none.

In addition, when it becomes necessary to store golf carts during off-season or when not in use a separate storage cover usually must be placed over the standard enclosure to keep the plastic vinyl panels, which are partially transparent, from deteriorating due to sun and weather exposures.

Thus, there exists a need for a golf cart enclosure that provides protection for occupants during varying weather use and storage conditions.

Of the patents and publications reviewed with respect to the subject of the present invention, the following appear to be the most pertinent prior art:

| Pat. No. (U.S. unless stated otherwise) | Inventor | Issue Date |
|---|---|---|
| 2,546,843 | Zigterman | March 27, 1951 |
| 5,217,275 | Ridge | June 8, 1993 |
| 4,773,694 | Gerber | Sept. 27, 1988 |
| 5,211,214 | Shaw | May 18, 1993 |
| 3,709,553 | Churchill, et al. | Jan. 9, 1973 |
| 4,098,536 | Mills | July 4, 1978 |
| 4,013,315 | West | March 22, 1977 |
| 5,259,656 | Carroll | Nov. 9, 1993 |

The Zigterman patent teaches the use of storm shields and an insect net on a baby carriage, both of which are attached to rollers so they can be unrolled or rolled-up, as needed. However, the Zigterman invention has a substantially different structure than the present invention and could not be used on a golf cart or similar vehicle. The Ridge patent discloses an entire cover made of netting, rather than vinyl, but it does not combine pairs of plastic vinyl and/or mesh panels in one enclosure as does the present invention. The Gerber patent shows roll-up vinyl panels, but no mesh panels. The Churchill, et al enclosure is made of transparent plastic curtains which slide along a guide in the roof to one side; however, Churchill does not include a mesh panel. The Mills patent shows another golf cart enclosure with panels made of plastic vinyl, but it has no mesh panel. The West patent teaches another enclosure with vinyl panels that tie to corner posts, but includes no mesh panels. Finally, the Carroll patent teaches an enclosure with roll-up vinyl panels that are held under a roll cover extension of the roof panel. However, like the other patents, the Carroll enclosure does not have pairs of vinyl and/or mesh panels.

On the other hand, the golf cart enclosure of the present invention has inner and outer panels suspended from a top panel covering the roof of a golf cart. Either or both of the outer and inner sets of panels can be rolled-up and secured under a roll cover extension of the enclosure top panel. The use of inner screen or mesh panels under outer plastic panels allows the plastic panels of the enclosure to be rolled-up while the screen panels are down so that the enclosure can protect the occupants from insects and also keep the occupants cooler than conventional golf cart enclosures with only plastic side panels. Currently, such conventional enclosures with only plastic panels require that side panels be down to protect the occupants from insects, which makes the golf cart feel like a sauna, particularly on hot and muggy days in Florida and other southern states.

SUMMARY OF THE INVENTION

A primary object of the present invention is to provide an enclosure for a golf cart which can be used during almost all whether and use conditions to protect the occupants from adverse weather, insects and errant golf balls.

Another object of the present invention is to provide such a golf cart enclosure which not only protects the occupants, but is comfortable to the occupants of the golf cart.

A further object of the present invention is to provide such an enclosure where either or both pairs of plastic side panels and/or screen side panels can be rolled-up and secured.

An even farther object of the present invention is to provide such an enclosure wherein both the vinyl and screen panels are protected from the sun and weather when in a rolled-up position.

An additional object of the present invention is to provide a golf cart enclosure that has outer panels that can be used as a storage cover during the off-season or non-use.

The present invention fulfills the above and other objects by providing an enclosure that has a top panel which fits over the roof of a golf cart or other vehicle to which are attached a pair of inner and outer panels forming the enclosure on at least two sides of the golf cart, the inner panels which may be made substantially of mesh material to allow air to flow through same and the other set made of a plastic vinyl-like material, an upper portion of which is transparent. Alternatively, both pairs of inner and outer panels which may both be of plastic vinyl or other material with the outer panels being a storage cover panel. Either or both of the panels may be secured in a rolled-up position by means which includes straps between and on each side of each set of panels. The straps could include male and female strap combinations which would allow the straps to fit around rolled-up panels to maintain them in a rolled-up position. The enclosure may also contain rear panels which would cover the back of the golf cart to protect the occupants and, particularly, the golf clubs and bags contained behind the seats in the golf cart. The inner set of panels in the rear of the golf cart may have an opening in them to expose the top of the golf club bag so that clubs may be removed without having to roll up the rear inner panels as well. Furthermore, a panel or set of inner and outer panels being made of transparent plastic vinyl-like material and a panel made of mesh material may cover the front of the golf cart, particularly where the golf cart does not have a hard windshield. The panels, when in an unrolled suspended position, may be secured to the golf cart by a series of straps and "S"

hooks so that they do not flap in the wind. The sets of panels on the sides of the golf cart from which occupants enter and leave may contain a zipper so that only half of the side panels may be placed in a rolled-up position or kept in a down position as desired by the occupants.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
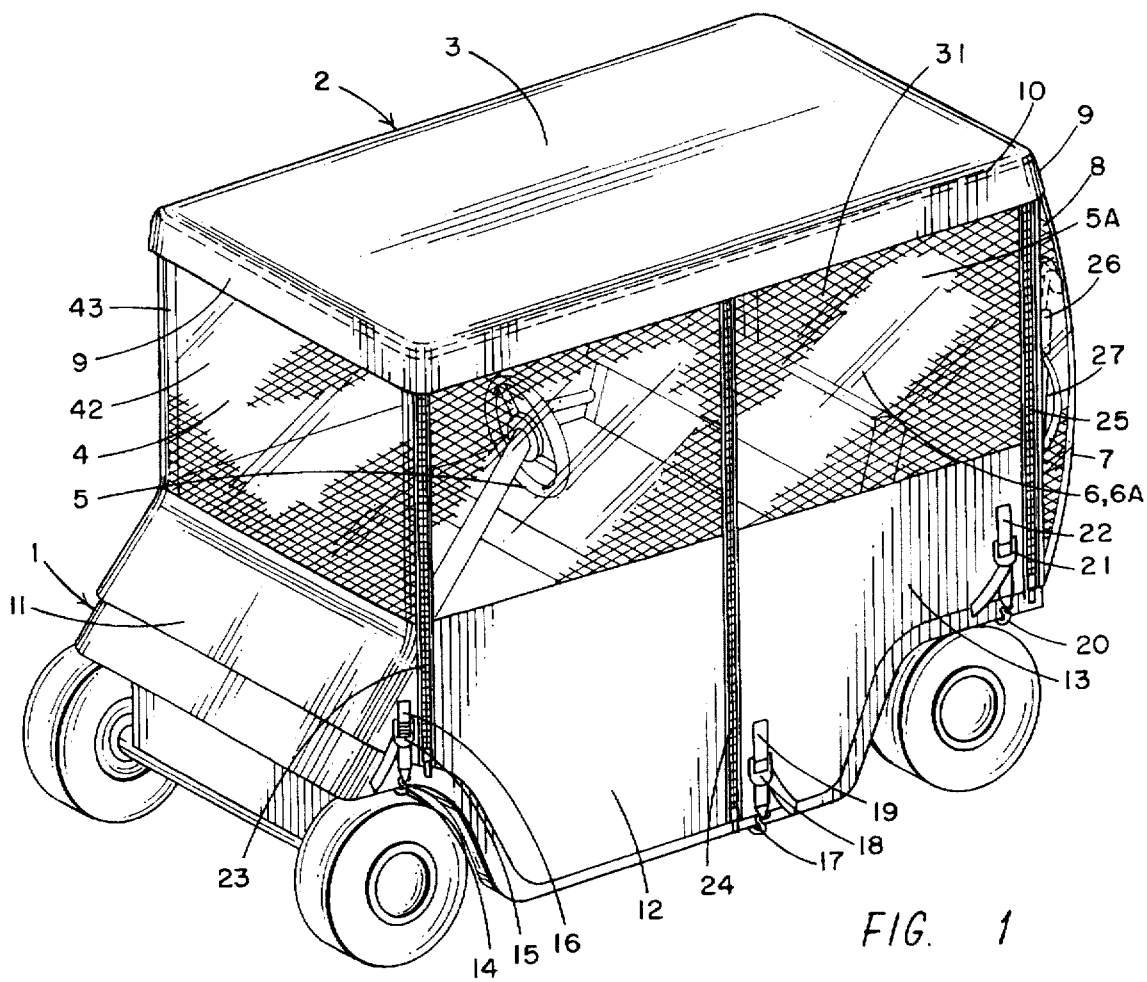
FIG. 1 is a front perspective view of the enclosure of the present invention in place on a golf cart.

Referring now to the drawings, a golf cart 1 is shown with the enclosure of this invention 2 secured thereto. As illustrated in FIG. 1, the enclosure 2 has a top panel 3 which is sized to cover the hard roof of the golf cart. Attached to and suspended from the top panel 3 are side panels 5 and 5A, generally the outer set of side panels 5 and 5A having a transparent top portion 6 and 6A so that the occupants can see out of the golf cart and a lower portion 12 and 13 made of opaque plastic vinyl-like material.

In cases where there is no hard windshield on the golf cart, the enclosure 2 would also have a front panel having a transparent top portion 4 and lower opaque portion 11. The present invention provides for an inner set of panels 31 on the sides of the golf cart and in the front panel as well if desired. The golf cart enclosure 2 would also have a rear set of panels with an outer substantially transparent plastic panel 7 and an inner panel 8, preferably made substantially of mesh or screen, designed to cover the golf club bag and clubs 26 in the rear of the golf cart. The panels would be secured to the lower edges of the golf cart by a plurality of "S" hooks 14, 17 and 20 attached to the golf cart which in turn are attached to a series of straps 16, 19 and 22 and buckles 15, 18 and 21. In addition, as shown, the side panels 5 and 5A could be divided into sections connected by a zipper 24' and also attached to the front panel 4 by zippers 23 and the rear panels by zippers 25 at corner posts 43 of the golf cart. In this manner either section of the side panels could be rolled-up or kept down depending on the desires of the occupants. All of the panels would be secured to the top panel 3 by sewing or stitching 10.

As shown, an extension of the top panel 3 extends beyond the perimeter of the golf cart roof, or alternatively, a separate valance sewn to the edges of the top panel 3, provides a roll cover 9 to protect the panels from sun when secured in a rolled-up position as illustrated and described in conjunction with FIGS. 3, 4, 5 and 6.

Figure 2:
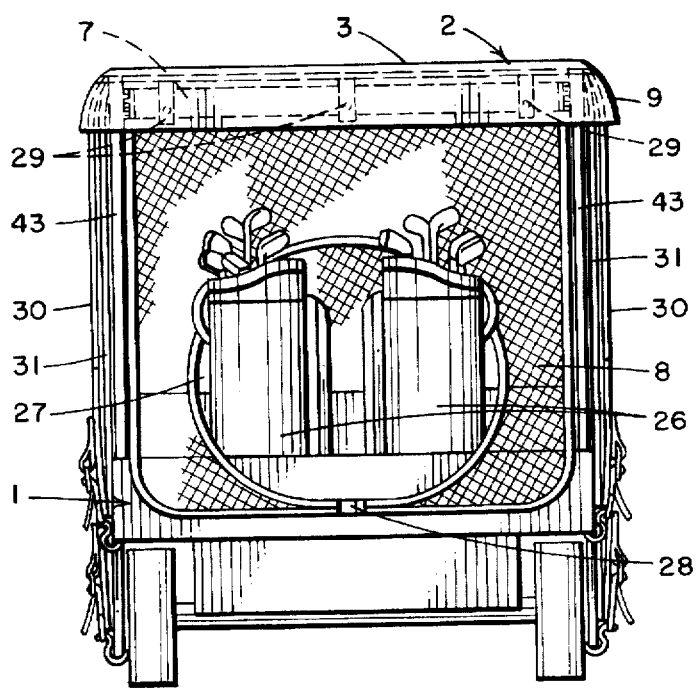
FIG. 2 is a rear plan view of the enclosure of the present invention with an outer plastic vinyl panel in a rolled-up position and an inner mesh panel in an unrolled suspended position.
Figure 3:
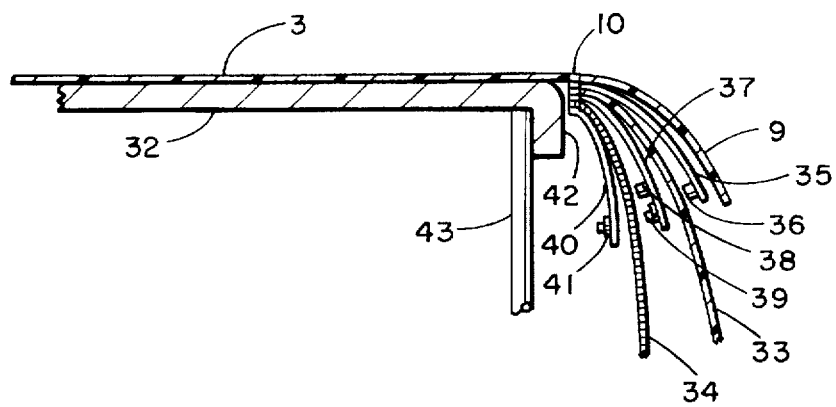
FIG. 3 is an enlarged cross-sectional view of the side panels of the present invention with both the inner and outer panels in a suspended unrolled position.

In FIG. 2 a rear view of the golf cart 1 shows the enclosure 2, and more particularly, the rear panels of the golf cart enclosure, having the rear plastic panel 7 secured in a rolled-up position by straps and snaps 29 under the roll cover 9. The inner panel 8 is in a suspended position and may have an opening 27 so as to expose the top of the golf club bags 26 to make it easy to remove the golf clubs as needed without having to also roll up the inner panel 8 as well. Also, the bottom of the opening 27 could be opened even further by releasing strips of loop and fastening material 28. Of course, the inner panel 8, whether made of mesh or vinyl, could also be rolled-up and maintained in that position by straps under the roll cover 9.

Figure 4:
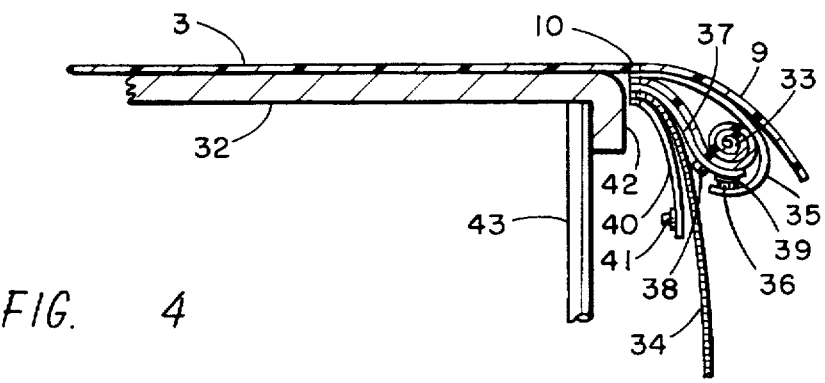
FIG. 4 is an enlarged cross-sectional view of the side panels of the present invention with only an inner panel in an unrolled suspended position and the outer panel in a rolled-up position.
Figure 5:
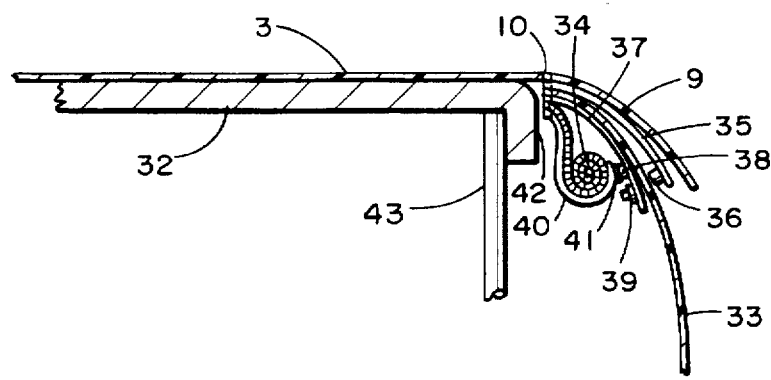
FIG. 5 is an enlarged cross-sectional view of the side panels of the present invention with the inner panel in a rolled-up position and the outer panel in a suspended unrolled position.
Figure 6:
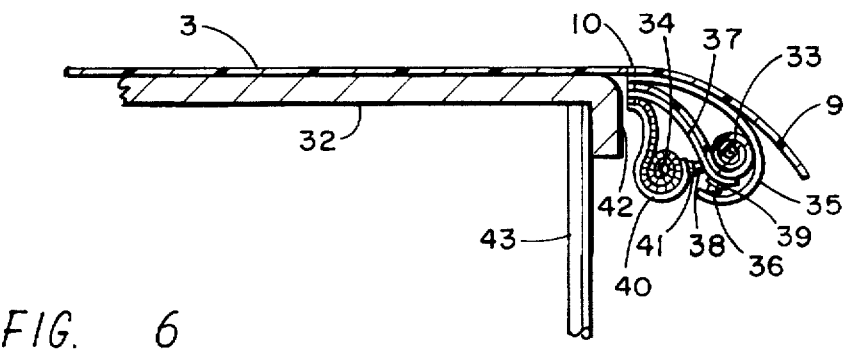
FIG. 6 is an enlarged cross-sectional view of the side panels of the present invention showing both the inner and outer side panels in a rolled-up position.

The illustrations in FIGS. 3, 4, 5, and 6 are used to better illustrate the construction of the sets of side panels and in particular, the means for securing one or more sets of the panels in a rolled-up position. More particularly, in FIG. 3 the side panels, consisting of outer plastic vinyl panels 33 and inner mesh panels 34, are shown in a unrolled suspended position. The top panel 3 of the enclosure 2 is shown over the golf cart roof 32. Fastening straps 35, 37 and 40 between and on each side of the panels are used as described hereinafter to secure the panels in a rolled-up position by the use of fastening means, such as male and female snap combinations 36 and 39, 38 and 41. Both side panels 33 and 34 and each of the straps 35, 37 and 40 are secured to the top panel 3 at a common stitch line 10 which extends around the perimeter of the top panel 3. As illustrated, the top panel 3 extends beyond the perimeter 42 of the golf car roof 32 so as to provide a cover over the rolled-up panels as illustrated in FIGS. 4, 5 and 6. Of course, a separate valance secured to the top panel 10 would also provide a similar roll cover, but would require separate stitching.

FIG. 4 shows an outer plastic vinyl panel 33 in a rolled-up position secured between the outer panel-holding strap 35 and middle panel-holding strap 37 with the female snap component 36 on the outer panel-holding strap 35 secured to the male snap component 39 on the middle panel-holding strap 37. In the latter position, the inner panel 34 are in a suspended position suitable when the occupants of the golf cart desire protection from insects, such as mosquitos and gnats, and protection from errantly hit golf balls while still remaining cool on hot muggy days.

FIG. 5 shows an outer vinyl panel 33 in a suspended position with the inner panel 34 secured in a rolled-up position by securing the inner panel-holding strap 40 around the rolled-up panel 34 and snapping the male component 41 to the female component 38 on the middle panel-holding strap 37. The position of the panels shown in FIG. 5 would be suitable on cool or rainy days when insects may not be a problem, but the occupants still want protection from the cold, wind or rain.

The final illustration shown in FIG. 6 shows both sets of panels, an outer plastic panel 33 and an inner mesh panel 34 in a rolled-up position by wrapping the outer panel-holding strap 35 around the outer rolled-up panel 33 and securing it to the middle panel-holding strap 37 by attaching the female snap component 36 to the male strap component 39 and by wrapping the inner panel-holding strap 40 around the rolled-up mesh panel 34 and securing the male component 41 on the inner panel-holding strap 40 to the female component 38 on the middle panel-holding strap 37. The position of the panels shown in FIG. 6 would be suitable on nice days where neither insects nor weather is a problem and the occupants are not concerned about protection from errantly hit golf balls. Of course, the roll cover or valance 9 lies over the rolled-up panels to protect them from deterioration due to exposure from the sun.

Thus, as described herein, the present invention provides an all-weather and all-use conditions enclosure by using sets of inner and outer panels and providing a means for securing either or both sets of panels in a rolled-up position, depending on the weather and use conditions and the desires of the occupants.

Although only a few embodiments of the present invention have been described in detail hereinabove, all improvements and modifications to this invention within the scope or equivalents of the claims are covered by this invention.

Having thus described my invention, I claim:

1. An enclosure to cover a golf cart or similar vehicle having a roof and front, back and two sides, said enclosure comprising:

a top panel covering the roof of the golf cart; and a plurality of panels on at least the two sides of the golf cart forming a select enclosure, said panels being secured to a perimeter of the top panel, wherein the plurality of panels comprises two sets of panels, an inner set of panels and an outer set of panels.

2. The enclosure of claim 1 wherein the inner set of panels is made substantially of mesh and the outer set of panels is made substantially of plastic vinyl-like material.

3. The enclosure of claim 1 further comprising a panel made of plastic vinyl-like material is suspended from the top panel over the back of the golf cart.

4. The enclosure of claim 2 further comprising a panel made of plastic vinyl-like material is suspended from the top panel over the back of the golf cart.

5. The enclosure of claim 2 wherein the outer panel of plastic vinyl-like material has a transparent top portion and an opaque bottom portion.

6. The enclosure of claim 2 further comprising a panel of plastic vinyl-like material having with a transparent top portion and an opaque bottom portion is suspended from the top panel over the front of the golf cart.

7. The enclosure of claim 3 further comprising a panel of plastic vinyl-like material having with a transparent top portion and an opaque bottom portion is suspended from the top panel over the front of the golf cart.

8. The enclosure of claim 1 further comprising:
means for securing the panels in a rolled-up position.

9. The enclosure of claim 2 further comprising:
means for securing the panels in a rolled-up position.

10. The enclosure of claim 3 further comprising:
means for securing the panels in a rolled-up position.

11. The enclosure of claim 4 further comprising:
means for securing the panels in a rolled-up position.

12. The enclosure of claim 5 further comprising:
means for securing the panels in a rolled-up position.

13. The enclosure of claim 6 further comprising:
means for securing the panels in a rolled-up position.

14. The enclosure of claim 7 further comprising:
means for securing the panels in a rolled-up position.

15. The enclosure of claim 1 further comprising a pair of panels, an inner panel and an outer panel, suspended from the top panel over the back of the golf cart.

16. The enclosure of claim 15 wherein the inner panel is made substantially of mesh material and the outer panel is made substantially of plastic vinyl like material.

17. The enclosure of claim 1 further comprising a pair of panels, an inner panel and an outer panel, suspended from the top panel over the front of the golf cart.

18. The enclosure of claim 17 wherein the inner panel is made substantially of mesh material and the outer panel is made substantially of plastic vinyl like material.

19. The enclosure of claim 15 further comprising a means for securing the panels in a rolled-up position.

20. The enclosure of claim 16 further comprising a means for securing the panels in a rolled-up position.

21. The enclosure of claim 17 further comprising a means for securing the panels in a rolled-up position.

22. The enclosure of claim 18 further comprising a means for securing the panels in a rolled-up position.

23. The enclosure of claim 8, 9, 10, 11, 12, 13, 14, 19, 20, 21 or 22 wherein the means for securing the panels in a rolled-up position comprises a plurality of straps with snaps attached to the top panel which extend a sufficient distance between and on each side of each inner and outer panel and wrap around the panels when they are in a rolled-up position.

24. The enclosure of claim 15, 16, 19 or 20 wherein the inner panel contains a hole therein to expose at least an upper portion of one or more golf club bags in a rear of the golf cart so that the golf clubs may be removed from a bag without having to roll up the mesh panels.

25. The enclosure of claim 1, 2, 3, 4, 5, 6, 7, 8, 9, 10, 11, 12, 13, 14, 15, 16, 17, 18, 19, 20, 21 or 22 wherein the top panel extends beyond a perimeter of the golf cart or other vehicle so as to form a cover over the panels when the panels are in a rolled-up position.

26. The enclosure of claim 1, 2, 3, 4, 5, 6, 7, 8, 9, 10, 11, 12, 13, 14, 15, 16, 17, 18, 19, 20, 21 or 22 wherein the outer set of panels forms a storage cover when in the unrolled suspended position.

* * * * *